(12) United States Patent
Rock et al.

(10) Patent No.: US 6,595,738 B2
(45) Date of Patent: Jul. 22, 2003

(54) SIDE DOOR LIFT GATE

(75) Inventors: Ken Rock, Tallmadge, OH (US); Andy Grow, Uniontown, OH (US)

(73) Assignee: Waltco Truck Equipment, Tallmadge, OH (US)

( * ) Notice: Subject to any disclaimer, the term of this patent is extended or adjusted under 35 U.S.C. 154(b) by 25 days.

(21) Appl. No.: 09/910,570

(22) Filed: Jul. 20, 2001

(65) Prior Publication Data

US 2002/0037212 A1 Mar. 28, 2002

Related U.S. Application Data

(63) Continuation of application No. 09/491,887, filed on Jan. 24, 2000.
(60) Provisional application No. 60/156,789, filed on Sep. 30, 1999.

(51) Int. Cl.$^7$ .................................................. B60P 1/44
(52) U.S. Cl. ...................... 414/541; 187/222; 254/2 R; 414/921; 414/543; 414/812
(58) Field of Search ................................. 414/539, 540, 414/541, 542, 543, 921, 545, 556, 800, 812, 814; 254/2 R; 187/222

(56) References Cited

U.S. PATENT DOCUMENTS

| | | |
|---|---|---|
| 3,182,826 A | 5/1965 | Mutto |
| 4,281,744 A | 8/1981 | Koerber |
| 4,456,421 A | 6/1984 | Robson ........................ 414/546 |
| 4,476,959 A | 10/1984 | Tortellier |
| 4,479,753 A | 10/1984 | Thorley ........................ 414/541 |
| 4,579,503 A | 4/1986 | Disque ......................... 414/558 |
| 4,627,784 A | 12/1986 | Collins ......................... 414/540 |
| 4,664,584 A | 5/1987 | Braun et al. ................. 414/541 |
| 5,016,244 A | 5/1991 | Massey, Jr. et al. .......... 370/16 |
| 5,026,244 A | 6/1991 | Dorn ........................... 414/540 |
| 5,149,246 A | 9/1992 | Dorn ........................... 414/541 |
| 5,180,275 A | 1/1993 | Czech et al. ................. 414/541 |
| 5,542,811 A | 8/1996 | Vartanian .................... 414/541 |
| 5,613,825 A | 3/1997 | Dorn ........................... 414/543 |
| 5,864,101 A | 1/1999 | Nishizawa et al. ......... 187/285 |

FOREIGN PATENT DOCUMENTS

| | | |
|---|---|---|
| FR | 2437373 | 9/1979 |

OTHER PUBLICATIONS

International Search Report.

*Primary Examiner*—Frank E. Werner
(74) *Attorney, Agent, or Firm*—Brouse McDowell; Roger D. Emerson; Marcella R. Louke

(57) ABSTRACT

A lift gate assembly particularly adapted for use in a vehicle having a side opening. The assembly includes a platform that folds and pivots to the interior of the vehicle when in a stored mode. When deployed, the platform pivots to the exterior of the vehicle and unfolds. A telescoping column allows movement of the unfolded platform between upper and lower levels. Movement of the platform may be accomplished by employing hydraulic means.

9 Claims, 4 Drawing Sheets

SIDE DOOR LIFT GATE

BACKGROUND OF THE INVENTION

This application is a continuation of Ser. No. 09/491,887 filed Jan. 24, 2000. This application claims the benefit of U.S. Provisional Application, Ser. No. 60/156,789, filed on Sep. 30, 1999, in Express Mail Label No. EL359134972US by the same inventors, Ken Rock and Andy Grow, entitled SIDE DOOR LIFT GATE.

This invention pertains to methods and apparatuses for lift gates, and more specifically to methods and apparatuses for a lift gate provided on the side of a vehicle.

DESCRIPTION OF THE RELATED ART

Lift gates for lifting objects into and out of vehicles are relatively well known. Typically, these lift gates are hydraulically operated and are mounted at the rear of a large vehicle such as a tractor-trailer. The lift gates allow objects to be easily loaded into the vehicle and unloaded from the vehicle by raising and lowering the objects.

Some side-door lifting apparatuses have been contemplated in the prior art. For example, U.S. Pat. No. 4,479,753 to Thorley discloses a retrofittable wheelchair lift for passenger vehicles. The lift assembly is hinged on a vertical axis to a door post adjacent the door hinge. When the door opens, the lift assembly pivots away from the door opening. A horizontal carrier slides further outwardly so that the lift assembly clears the side of the vehicle. A single telescoping vertical carrier is deployed by a hydraulic actuator to lower a platform which then rotates away from the vertical carrier along a horizontal hinge located at the lower edge of the vertical carrier. This lifting apparatus requires a horizontal carrier to ensure clearance of the platform from the side of the vehicle. Also, this lifting apparatus is mounted onto the door of the vehicle which restricts both the weight of lifting apparatus and the amount of weight that can be lifted.

U.S. Pat. No. 4,456,421 to Robson discloses a lifting apparatus carried in an inoperative compact form within the interior of a vehicle and deployed in an operative position outside the vehicle. A pillar is provided in the interior of the vehicle near either a side or rear door. The disclosed lifting apparatus utilizes a parallelogram linkage to raise and lower the platform. This lifting apparatus is directed to the lifting of wheelchairs. Again, this design restricts the amount of weight that can be lifted.

The present invention contemplates a new and improved lift gate construction which is simple in design, effective in use, and overcomes the foregoing difficulties and others while providing better and more advantageous overall results.

SUMMARY OF THE INVENTION

According to one aspect of the invention a lift gate is provided which is associated along the side of a vehicle. For instance, the lift gate may be located anywhere along the side of a tractor-trailer.

According to another aspect of the current invention, the lift gate folds so as to be recessable within the side of the vehicle.

According to another aspect of the current invention, the side lift gate has a platform operatively connected to a telescopic column. The column allows the platform to be raised and lowered so that objects may be loaded into and out of the side of the vehicle.

According to another aspect of the invention, a lifting apparatus adapted for use in an associated vehicle having a floor and one upright wall having an opening therein is provided. The lifting apparatus is operable between a stowed mode and a deployed mode. The lifting apparatus comprises a platform having a generally planar loading surface and adapted for movement between a folded position and an open position, elevator means for selectively moving the platform between an upper level and a lower level, first pivot means being operable to pivot the elevator means and the platform while the platform is in the folded position from an interior side of the opening to an exterior side of the opening about a first pivot member having a first axis generally normal to the floor, and second pivot means for selectively pivoting the platform between the folded position and the open position about a second pivot member having a second axis perpendicular to the first axis.

According to another aspect of the invention, the lifting apparatus further includes means for controlling the pivotal motion of the platform about the second axis.

According to another aspect of the invention, the first pivot member comprises a post adapted for mounting to the floor of the vehicle at a position displaced from the opening.

According to another aspect of the invention, the elevator means includes a telescoping member operable along an axis parallel to the first axis wherein a lower portion is adapted to telescope within an upper portion, the telescoping member being spaced from the first pivot member.

According to another aspect of the invention, the lifting apparatus further includes a first cross member extending between the first pivot member and the first portion of the telescoping member.

According to another aspect of the invention, the lifting apparatus further includes first switching means for activating the elevator means wherein the first switching means is located on the elevator means.

According to another aspect of the invention, the lifting apparatus further includes second switching means for activating the elevator means wherein the second switching means is selectively moveable with the platform.

According to another aspect of the invention, each of the up and down movements of the platform is accomplished through hydraulic means.

According to another aspect of the invention, a method for utilizing a lift gate apparatus is provided. The method includes the step of pivoting the elevator means and platform while the platform is in a folded position from the interior side of the opening to the exterior side of the opening about the first pivot member; pivoting the platform from the folded position to the open position about the second pivot member; and, utilizing the elevator means to lower the platform to the lower level.

One advantage of the present invention is that semi-tractor trailers can be retrofitted with the lifting apparatus to provide access to the cargo area via a side door.

Another advantage of the present invention is that the lifting apparatus can be carried within the vehicle interior to prevent unnecessary exposure to the elements and corrosive road salt.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
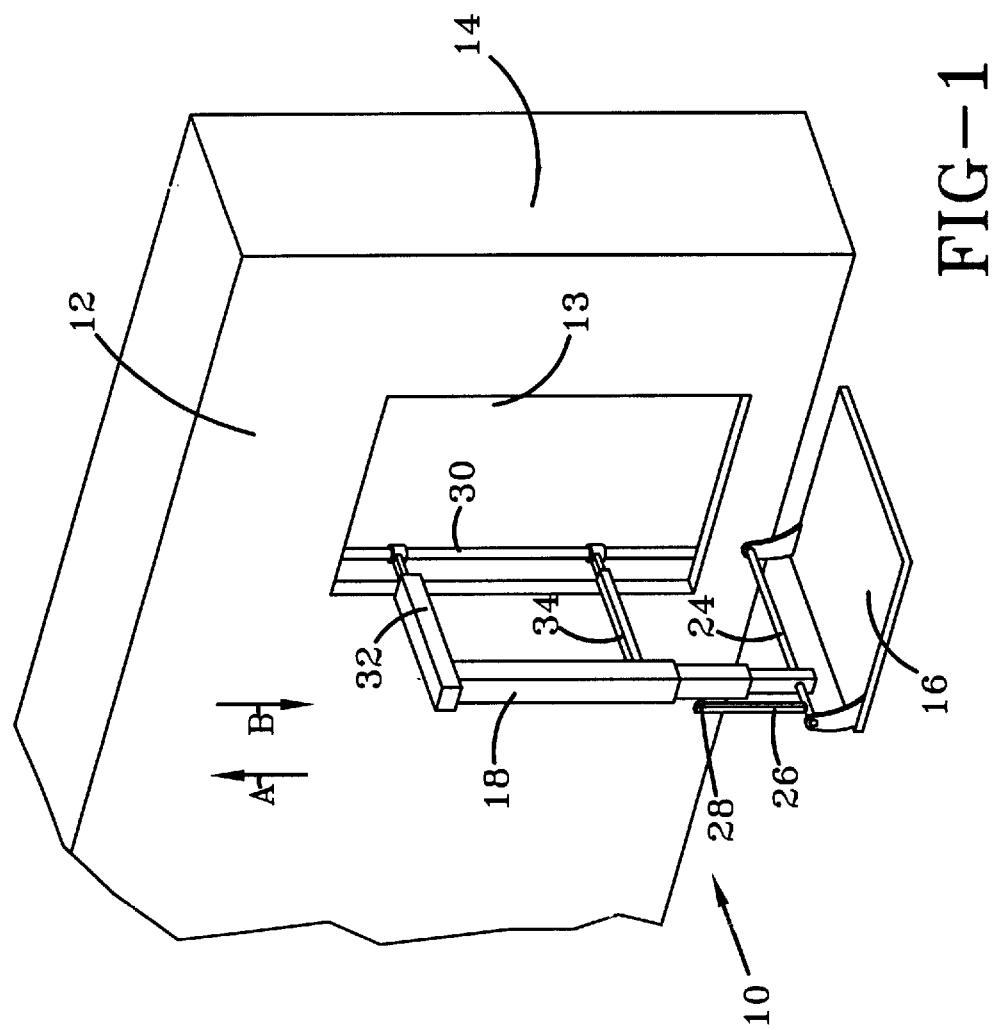
FIG. 1 is a perspective view of the side lift gate in an unfolded and lowered position.

Referring now to the drawings, which are for purposes of illustrating a preferred embodiment of the invention only, and not for purposes of limiting the invention, FIGS. 1–4 show the preferred embodiment of the invention. The present invention is shown mounted in an opening in the side of a vehicle 12. The lift gate assembly 10 is shown near one end 14 of the vehicle 12. It is to be understood that lift gate assembly 10 can be mounted anywhere on the side of the vehicle 12, as well as at the rear. Vehicle 12 is provided with an opening 13 through which objects may be loaded or unloaded. In a preferred embodiment, the lift gate assembly 10 is received within the opening 13 when not in use.

As seen in the drawings the lift gate assembly 10 has a platform 16 that may be made out of any material chosen with sound engineering judgement, but preferably it is made out of aluminum for lightweight and corrosion-resistant qualities. Preferably, the upper surface 20 is corrugated or ridged for traction.

Figure 2:
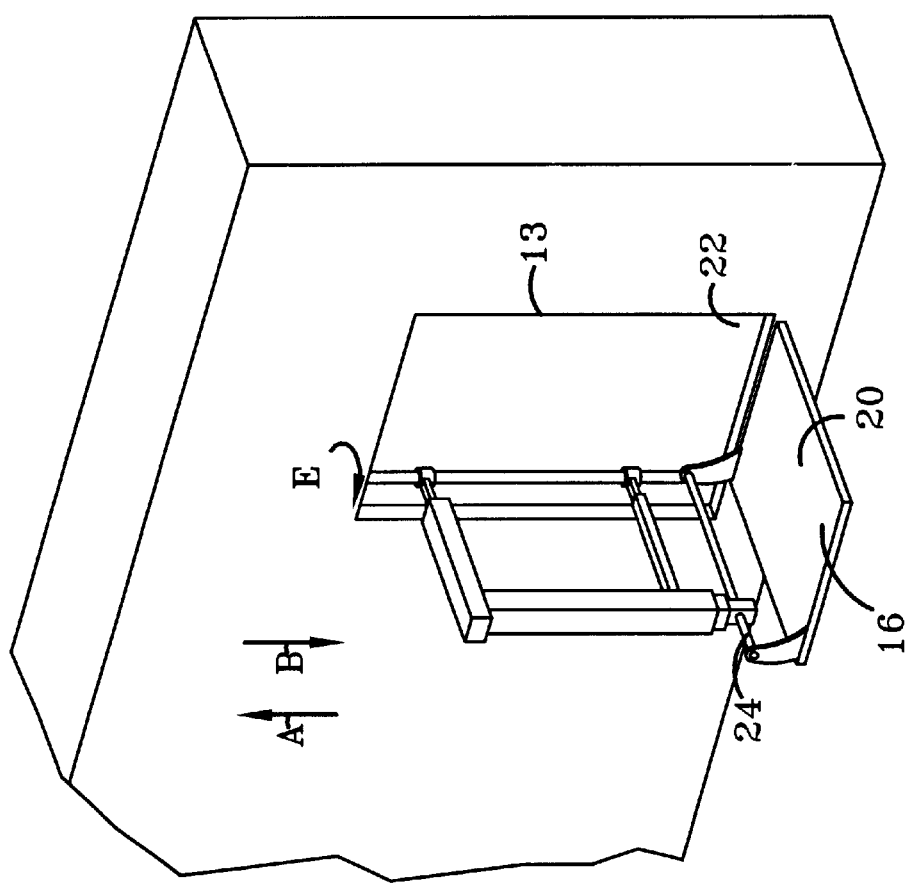
FIG. 2 is a perspective view showing the lift gate with the platform nearly flush with the floor of an associated vehicle.
Figure 3:
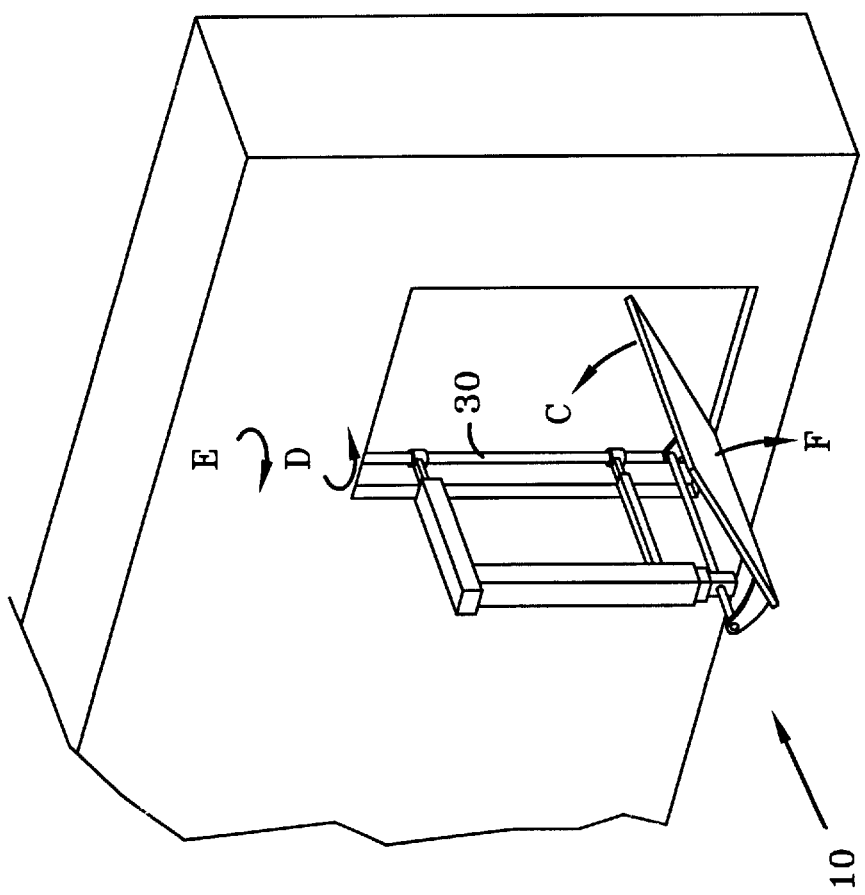
FIG. 3 is a perspective view showing the platform of the lift gate in a partially folded position.
Figure 4:
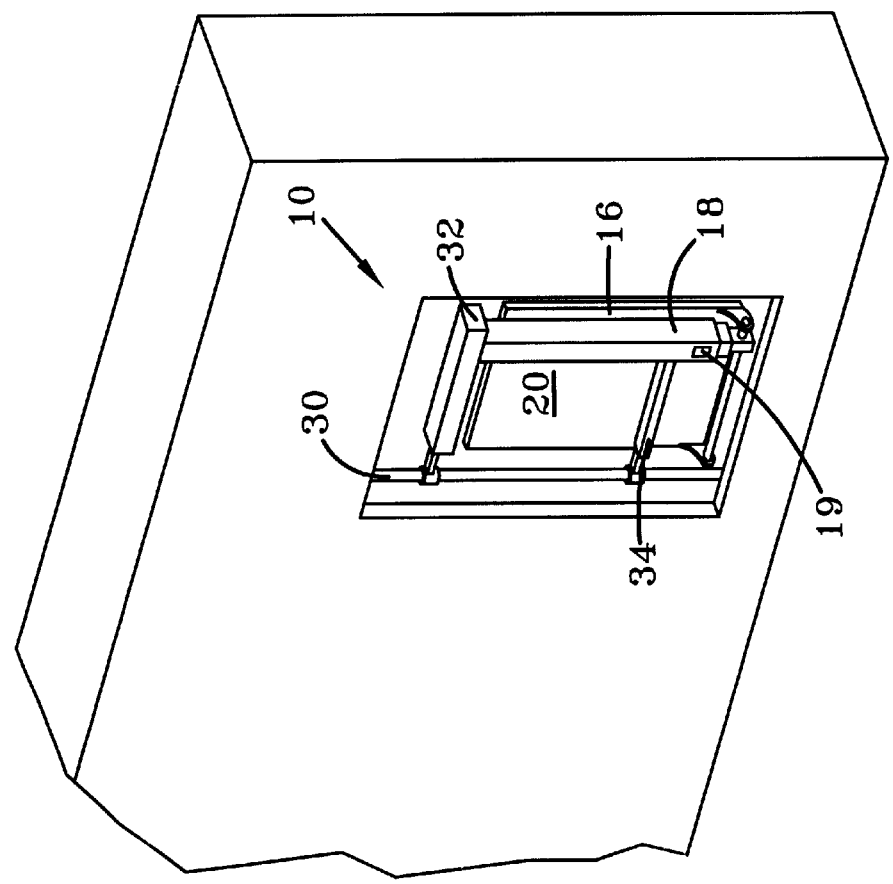
FIG. 4 is a perspective view showing the lifted gate in its completely retracted position.

With reference to FIGS. 1–4, the lift gate assembly 10 also comprises a telescoping column 18 which operates to raise and lower the platform 16. In the preferred embodiment, platform 16 is mounted to stabilizing column 24 which is itself attached to a lower portion of telescoping column 18. Objects placed upon the platform 16 are thereby raised and lowered so that they may be loaded onto and unloaded off of the vehicle 12. The column 18 telescopes in a vertical direction, indicated by arrow A, to lift the platform 16 and objects thereon. In the preferred embodiment, column 18 includes three telescoping members having nesting hexagonal cross-sectional shapes, although other configurations are within the scope of the present invention. The column 18 extends in the opposite vertical direction, indicated by arrow B, to lower the platform 16 so that objects may be unloaded from the vehicle. The column 18 may be caused to telescope in any manner chosen with sound engineering judgement, however it is preferred that hydraulic means are used to cause the column 18 to telescope and thereby raise/lower platform 16. In the preferred embodiment, the lift gate assembly includes first switching means 19, located on the lower back side of an upper portion of column 18 as shown in FIG. 4, to activate the telescoping mechanism. The operation of this first switching means 19 will be discussed in further detail below. Also in the preferred embodiment, second switching means 28 are provided on a post 26 (shown in FIG. 1). Post 26 is preferably mounted onto stabilizing column 24 and remains in a vertical position throughout operation of the lift gate assembly 10. This second switching means 28 is alternately utilized to cause column 18 to telescope and thereby raise/lower platform 16. An operator chooses which switching means 19, 28 to use, depending on his position relative to the platform 16.

With reference to FIG. 2, the platform 16 is shown as almost being fully lifted by column 18 in a direction indicated by arrow A. It is to be understood that for ease of loading and unloading cargo that the fully lifted position of the platform 16 will have the top surface 20 of the platform 16 substantially flush with the plane of the inside floor 22 of the vehicle. Thus an object that, for example, rolls on casters may be easily wheeled from the top of the platform 20 onto the plane of the floor of the vehicle 22. Likewise, to remove an object from the vehicle 12, it may easily be wheeled or rolled from the floor 22 of the vehicle onto the platform 16.

With reference now to FIG. 3, the platform 16 of the lift gate assembly 10 is shown in a partially folded condition. When folding, the platform 16 preferably rotates in a direction toward column 18, indicated by arrow C in FIG. 3. In the preferred embodiment, the platform pivots about a stabilizing column 24, best seen in FIGS. 1 and 2. While a stabilizing column 24 is used in the preferred embodiment, any member about which the platform 16 may pivot may be used in the invention, provided that it is chosen with sound engineering judgment. For instance, the platform may merely be hinged to the telescoping column 18. Thus, rather than having the stabilizing column 24, a hinge may connect the platform 16 to the telescoping column 18. As with the telescoping column 18, the rotation of platform 16 in the direction indicated by arrow C may be performed in any manner chosen with sound engineering judgement. In the preferred embodiment, manual force is utilized to rotate the platform 16 about the stabilizing column 24, both from the folded position to an open position as indicated by arrow F and from the open position to the folded position as indicated by arrow C. However, it is conceivable that the operation of the platform can be effected by other means, such as a hydraulic mechanism.

For ease of illustration, shown only in FIG. 1, the preferred embodiment of the current invention also includes a vertically extending post 26, which may be utilized as a handrail by an operator riding on the platform 16 as will be explained in further detail below. Second switching means 28 are disposed near an upper end of post 26.

Again with reference to FIG. 3 when the platform 16 is in its fully upright, folded position, the lift gate assembly 10 may be stored in the interior of vehicle 12 by pivoting about the member 30. In the preferred embodiment, pivotal movement of the telescoping column 18/platform 16 combination about member 30 is accomplished by manual force. However, it is anticipated that other means, mechanical, hydraulic, etc., may be employed to accomplish the purposes of the invention.

As shown in FIG. 4, once the platform 16 is in its fully upright, folded position and the lift gate assembly 10 is fully closed, the lift gate assembly 10 is recessed within the opening 13 inside of the vehicle 12 or alternately, flush with the side. In the preferred embodiment, the lift gate assembly 10 extends approximately only 10 inches into the interior of the vehicle 12 for compact storage.

With reference to FIGS. 1–4, it can be seen that the preferred embodiment of the lift gate assembly 10 includes cross members 32 and 34. These members 32 and 34 extend between the member 30 and the telescoping column 18. These members provide support for the lift gate assembly 10.

Applicant notes that in the preferred embodiment, the telescoping column 18/platform 16 combination pivots toward vehicle 12, indicated by arrow D about member 30. However, it is to be understood this may be accomplished in any manner chosen with sound engineering judgement. Accordingly, the member 30, the cross members 32 and 34 may be hingedly connected to the side of the vehicle 12. Again, as with the other movements of the lift gate assembly 10, the movement of the lift gate assembly 10 indicated by arrow D may be accomplished in any manner chosen-with sound engineering judgement. In the preferred embodiment, the lightweight construction of the lift gate assembly 10 allows for manual operation. However, this movement could also be accomplished with hydraulic means.

With reference to FIGS. 1–4, a method for operating the lift gate assembly 10 from a fully stored position to an open, deployed position will be illustrated. Initially, access to the interior of the vehicle 12 is made by opening a cargo door, not shown. The telescoping column 18/platform 16 combination is caused to pivot outwardly about member 30 in a direction indicated by arrow E. In the preferred embodiment, this movement is accomplished manually. Once the combination is fully pivoted about member 30, the platform 16 may be opened from its folded position by pivotal movement about column 24 in the direction indicated by arrow F. Again, in the preferred embodiment, this operation is accomplished manually.

Once the platform 16 has been fully pivoted about the column 24 such that it is parallel to the plane 22 of the floor of the vehicle 12, the column 18 may be caused to extend in the direction indicated by arrow B. This action is preferably accomplished by hydraulic means activated by first switching means 19. First switching means 19 are located to be easily accessed by an operator standing on the ground. The platform 16 is ultimately completely lowered to the ground. The operator may mount the platform 16, and utilize second switching means 28 located on post 26 to raise the platform 16 to the upper position where the top surface 20 is level with the floor of the vehicle 12. From there, the operator can move cargo onto the platform 16 to unload the vehicle 12. The second switching means 28 can be utilized again to lower the platform 16, operator, and cargo to ground level. This process can be repeated as often as necessary to fully unload the vehicle 12. Post 26 may be utilized as a handrail by the operator for safety considerations. After the cargo is removed, the lowered platform 16 may be raised by activating the first switching means 19. The platform 16 can be manually folded in the direction of arrow C. Thereafter, the lift gate assembly can be repositioned inside the vehicle interior by pivotal motion about member 30. It is readily apparent that the vehicle 12 can be loaded with cargo by reversing the actions given above.

The preferred embodiment of the present invention exhibits the following characteristics:

Bed Height Range . . . Up to 56"
Platform Sizes . . . 28"×39" 37"×48"
Door Opening Requirements . . . Compatible with doors as small as 39"W×66"H
Requirements . . . Compatible with doors as small as 39"W×66"H
Capacity
Lifting . . . 450 lbs.
Lowering . . . 1,000 lbs.

The invention has been described with reference to the preferred embodiment. Obviously, modifications and alterations will occur to others upon a reading and understanding of the specification.

What is claimed is:

1. A lifting apparatus adapted for use in an associated vehicle having a floor and one upright wall having an opening therein, the lifting apparatus being operable between a stored mode position and a deployed mode position, said lifting apparatus comprising:

a platform having a generally planar loading surface, said platform adapted for movement between a folded position and an open position;

elevator means for selectively moving said platform between an upper level and a lower level;

first pivot means for pivoting said elevator means and said platform while said platform is in said folded position, said first pivot means including a first pivot member having a first axis, said first pivot member being adapted for substantially vertical alignment relative to said floor of said associated vehicle; and, second pivot means for selectively pivoting said platform between said folded position and said open position, said second pivot means including a second pivot member having a second axis perpendicular to said first axis;

first switching means being functional to activate said elevator means for selectively moving said platform between said upper level and said lower level, said first switching means maintaining a fixed position during said selective moving of said platform;

second switching means being functional to alternately activate said elevator means for selectively moving said platform between said upper level and said lower level, said second switching means being selectively vertically moveable with said platform;

wherein said first axis and said second axis are coplanar; and, wherein said deployed mode position is rotationally removed approximately 90° from said stored mode position.

2. The lifting apparatus of claim 1 wherein said first pivot member comprises:

a post adapted for mounting to said floor of said vehicle at a position displaced from said opening.

3. The lifting apparatus of claim 1 wherein said elevator means comprises:

a telescoping member operable along an axis parallel to said first axis wherein a lower portion is adapted to telescope within an upper portion, said telescoping member being spaced from said first pivot member.

4. The lifting apparatus of claim 3 further comprising:

a first cross member extending between said first pivot member and said upper portion of said telescoping member, said first cross member being operable to support said elevator means a fixed predetermined distance from said first pivot member.

5. The lifting apparatus of claim 4 further comprising:

a second cross member being spaced from said first cross member and extending between said first pivot member and said first portion of said telescoping member.

6. The lifting apparatus of claim 1 wherein said platform is formed of aluminum.

7. The lifting apparatus of claim 1 wherein said elevator means further comprises:

hydraulic means for selectively moving said platform between said upper level and said lower level.

8. A lifting apparatus adapted for use in an associated vehicle having a floor and one upright wall having an opening therein, the lifting apparatus being operable between a stored mode position and a deployed mode position, said lifting apparatus comprising:

a platform having a generally planar loading surface, said platform adapted for movement between a folded position and an open position;

elevator means for selectively moving said platform between an upper level and a lower level, said elevator means comprising a telescoping member operable along an axis wherein a lower portion is adapted to telescope within an upper portion;

first pivot means for pivoting said elevator means and said platform while said platform is in said folded position, said first pivot means including a first pivot member having a first axis, said first pivot member being adapted for substantially vertical alignment relative to said floor of said associated vehicle;

second pivot means for selectively pivoting said platform between said folded position and said open position about a second axis perpendicular to said first axis, wherein said first axis and said second axis are coplanar;

a first cross member extending between said first pivot member and said upper portion of said telescoping member, said first cross member being operable to support said elevator means a fixed predetermined distance from said first pivot member;

first switching means for activating said elevator means, said first switching means being located on said upper portion of said telescoping member, said first switching means maintaining a substantially constant vertical position during operation of said elevator means; and, second switching means for alternatively activating said elevator means, said second switching -means being selectively vertically moveable with said platform;

wherein said deployed mode position is rotationally removed approximately 90° from said stored mode position.

9. A method for utilizing a lifting apparatus being adapted for unloading associated cargo from an associated vehicle having a floor and one upright wall having an opening therein, said method comprising the steps of:

providing a lifting apparatus initially in a stored mode position, said lifting apparatus comprising:

a platform having a generally planar loading surface, said platform being adapted for movement between a folded position and an open position;

elevator means operably associated with said platform for selectively moving said platform between an upper level and a lower level, said elevator means comprising a telescoping member operable along an axis wherein a lower portion is adapted to telescope within an upper portion;

first pivot means for pivoting said elevator means and said platform while said platform is in said folded position wherein said first pivot means includes a first pivot member defining a first pivot axis and wherein said first pivot member is adapted for substantially vertical alignment relative to said floor of said associated vehicle;

second pivot means for selectively pivoting said platform between said folded position and said open position, said second pivot means including a second pivot member defining a second pivot axis perpendicular to said first axis, wherein said first pivot axis and said second pivot axis are coplanar;

a first cross member extending between said first pivot member and said upper portion of said telescoping member, said first cross member being operable to support said elevator means a fixed predetermined distance from said first pivot member;

first switching means for activating said elevator means, said first switching means being located on said upper portion of said telescoping member, said first switching means maintaining a substantially constant vertical position during operation of said elevator means;

second switching means for alternatively activating said elevator means, said second switching means being selectively vertically moveable with said platform;

pivoting said elevator means and said platform while said platform is in said folded position approximately 90° about said first axis to place said lifting apparatus into a deployed mode position;

pivoting said platform from said folded position to a substantially horizontal position;

utilizing said first switching means to activate said elevator means and thereby lower said platform to said lower level;

utilizing said second switching means to activate said elevator means and thereby raise said platform to said upper level;

positioning said associated cargo onto said platform;

utilizing said second switching means to activate said elevator means and thereby re-lower said platform to said lower level.

* * * * *